Patented Apr. 4, 1950

2,502,978

UNITED STATES PATENT OFFICE 2,502,978

RECOVERY OF SECONDARY ALCOHOLS FROM ACID EXTRACTS

Vincent F. Mistretta, Fanwood, and Helmuth G. Schneider, Westfield, N. J., assignors to Standard Oil Development Company, a corporation of Delaware No Drawing. Application January 2, 1947, Serial No. 719,922

5 Claims. (Cl. 260—639)

This invention relates to the recovery of alcohol from an acid extract. More particularly, this invention is concerned with improvements in the recovery of secondary alcohols from extracts produced by absorption of olefinic hydrocarbons in sulphuric acid solutions.

It is known that olefins, for example, butylenes in gaseous or liquid phase may be absorbed by and reacted with sulphuric acid forming a mixture (acid extract) containing mono-butyl sulphate, di-butyl sulphate, free secondary butyl alcohol and uncombined sulphuric acid varying in quantities dependent upon the conditions of absorption. These acid extracts may be treated with water to convert the extract components to secondary butyl alcohol and sulphuric acid.

Various processes have been developed for the recovery of secondary butyl alcohol specifying dilution with water, hydrolysis and steam stripping accompanied with a loss of potential secondary butyl alcohol due to the decomposition of the acid extract components to butylene.

Many attempts in the past have been made to reduce this alcohol loss by hydrolysis of the acid extract with large quantities of water, thereby, maintaining low acid concentration for the stripping operation. Another method employed to minimize this loss was by stripping the diluted acid extract under vacuum. These modified operations have not reduced the loss substantially though they added considerably to the cost of the operation due to the increase in size of equipment, large volume of material to be handled for the volume of final product produced and increased fuel consumption (steam).

It is the object of this invention to improve the recovery of secondary butyl alcohol from acid extracts. A further object is to reduce considerably the loss in potential secondary butyl alcohol by minimizing olefin regeneration.

According to this invention the loss in potential secondary alcohols such as isopropyl, butyl and amyl alcohols as olefins can be considerably reduced in a given acid extract by carrying out the stripping operation in a plurality of stages, first removing the free alcohol in the extract by partial steam stripping and then complete steam stripping with or without hydrolysis between the stages until all the recoverable alcohol is obtained. The following description discloses how secondary butyl alcohol is recovered, but this is not to be held as a limitation as other secondary alcohols such as isopropyl and amyl can also be recovered.

Butyl acid extracts contain, in addition to mono- and di-butyl sulphates and sulphuric acid, free secondary butyl alcohol i. e. hydrated olefin in the extract which is not combined as mono- and di-butyl sulphate. The free alcohol content at times amounts to 50% by weight of total olefin in strong acid extracts. In dilute acid extracts the free alcohol may amount to 80%. Prolonged exposure of secondary butyl alcohol to sulphuric acid solutions results in regeneration of the free alcohol to butylene. Therefore, in the first step of the preferred operation the free secondary butyl alcohol is removed from the diluted acid extract by a partial steam stripping operation of short contact time. It is essential, in this process, that an acid level should not be maintained at the base of the first topping still to avoid olefin regeneration. The residual extract is further steam stripped of the remaining combined olefin by maintaining an acid level at the base of the final steam stripping stage to completely remove the olefin from the extract.

Further reduction of loss in potential alcohol can be obtained by a hydrolysis period after the first topping stage and prior to the final stripping stage. While this step is not essential it may be desirable and may be carried out at atmospheric or superatmospheric pressures.

Acid extracts of secondary butyl alcohol are obtained by contacting butylenes with sulphuric acid of 70 to 93% concentration. The acid extract thereby obtained is then diluted to 40 to 70% acid concentration. The preferred operation consists of passing a 40 to 55% sulphuric acid extract (hydrocarbon free basis) through a steam stripping column, or other conventional means i. e. internally or externally steam heated tubes or coils, with sufficient surface and contact time to remove essentially all of the free alcohol (50–80%) in the diluted extract without reducing the alkyl sulphate content of the extract. This stage, if desired, may be accomplished in a series of stripping operations or a single one (dealcoholization step). In no case, is it desirable to have the partially striped extract detained in the base of the still or stills of the first stripping stage. The desired contact time may be controlled by maintaining the same alkyl sulphate content of the extract at the bottom of the first stripping still as was charged. At this point, it is optional to hydrolyze the residual extract prior to the final stripping stage or hydrolyze the residual extract and repeat the topping stage or directly strip the residual extract. While a lower potential alcohol loss is obtained by these optional procedures the economical phases will determine their use. The residual extract then passes through the final stripping section for the essentially complete removal of olefin from the extract by maintaining an acid hold-up level at the base of the final stripping still.

The composition of the extract used for stripping is as follows:

Extract saturation 0.975 mols $C_4H_8$/mol $H_2SO_4$
Acid strength=52.05% (hydrocarbon free basis)
Percent $H_2SO_4$ as $RHSO_4$ (alkyl sulfate)=17%
Percent olefin in extract as "free" alcohol=82.5%

EXAMPLE 1

The acid extract was stripped by using open steam equivalent to 2 pounds per gallon of extract feed and maintaining a partially stripped acid extract level at the base of a stripping still equivalent to an acid hold-up time of approximately 15 minutes.

EXAMPLE 2

The acid extract is stripped in a still with a two-minute hold-up at the base of the still. The partially stripped acid extract is then re-stripped in a still having a 15-minute hold-up at the base of the still.

EXAMPLE 3

The acid extract was stripped in a similar manner to that disclosed in Example 2 except that there was no partially stripped acid extract hold-up at the base of the topping still.

The results are shown in the following table:

Table I

Charged:
  $H_2SO_4$ = 471 gms.
  $C_4H_8$ = 262 gms. (combined in extract)

|  | Example 1 | Example 2 | | Example 3 | |
| --- | --- | --- | --- | --- | --- |
|  |  | Topping | Final Stripping | Topping | Final Stripping |
| Recovered: |  |  |  |  |  |
| Olefin regenerated (gms. $C_4H_8$)____grams__ | 49.0 | 22.3 | 8.2 | 10.6 | 12.4 |
| Total olefin regenerated_____do____ | 49.0 |  | 30.5 |  | 23.0 |
| Olefin as alcohol in distillate_____do____ |  | 135.5 | 89.5 | 131.5 | 106.5 |
| Total olefin as alcohol in distillate____do____ | 218.5 |  | 225.0 |  | 238.0 |
| Summary: |  |  |  |  |  |
| Total olefin accounted for_____do____ | 267.5 |  | 255.5 |  | 261.0 |
| Total acid recovered_____do____ | 475.5 |  | 469.5 |  | 476.0 |
| Olefin in Extract regenerated____per cent__ | 18.3 |  | 11.9 |  | 8.8 |
| Olefin as alcohol in distillate_____do____ | 81.8 |  | 88.1 |  | 91.2 |

It will be noted that by stripping the extract in two stages in Examples 2 and 3, there is a considerable decrease in olefin regeneration over the normal procedure in Example 1. In Example 2 the decrease is 35% and in Example 3 it is 52%. These decreases in olefin regeneration are reflected in correspondingly increased alcohol yields.

The difference in olefin production between Examples 2 and 3 is due to the small partially stripped acid extract level kept at the base of the still in Example 2. Blowing steam through the partially stripped extract, even with a contact time of 2 minutes in Example 2, definitely increased olefin regeneration in the topping stage over that in Example 3.

Other examples of one-stage versus two-stage stripping are:

Analysis of feed extract—
  Extract saturation 1.080 mols $C_4H_8$/mol $H_2SO_4$
  Acid strength 46.5% (olefin free basis)
  Per cent $H_2SO_4$ as $RHSO_4$ (alkyl sulfate) = 44%
  Per cent olefin in extract as "free" alcohol = 59%

In each of the following examples 1,000 cc. of extract were used:

EXAMPLE 4

The acid extract was stripped in a similar manner to that disclosed in Example 1 except that a five-minute hold-up of partially stripped acid extract was kept at the base of the still.

EXAMPLE 5

The acid extract was stripped in a similar manner to that disclosed in Example 3, i. e., two-stage stripping was used. No partially stripped acid extract level was kept at the base of the topping still.

EXAMPLE 6

This two-stage stripping operation was carried out in a similar manner to that disclosed in Example 5 except that the partially stripped acid extract from the topping still was hydrolyzed one hour at 75°–80° C., at atmospheric pressure, before being finally stripped in the second-stage stripper.

The results were as follows:

Table II

Charged.
  Gms. $H_2SO_4$ = 408 gms.
  Gms. $C_4H_8$ = 251 gms. (combined in extract)

|  | Example 4 | Example 5 | | Example 6 | |
| --- | --- | --- | --- | --- | --- |
|  |  | Topping | Final Stripping | Topping | Final Stripping |
| Olefin regenerated (gms. $C_4H_8$) | 48.3 gms. | 13.5 g. | 21.6 gms. | 13.5 g. | 16.0 Hydrol and Str. |
| Total Olefin regenerated | 48.3 gms. |  | 35.1 gms. |  | 29.5 gms. |
| Olefin as Alcohol in distillate |  | 134.0 g. | 87.0 gms. | 131.5 g. | 105.5 gms. |
| Total Olefin as Alcohol overhead | 211.0 gms. |  | 221.0 gms. |  | 237.0 gms. |
| Olefin as Alc. in slop acid | 8.6 gms. |  | 1.5 gms. |  | 2.0 gms. |
| Total Olefin accounted for | 267.9 gms. |  | 257.6 gms. |  | 268.5 gms. |
| Total Acid recovered | 417.0 gms. |  | 412.0 gms. |  | 416.0 gms. |
| Olefin in Ext. Regener. | 18.0% |  | 13.65% |  | 11.0% |
| Olefin as Alc. in Dist. | 78.7% |  | 85.9% |  | 88.0% |
| Olefin in partially stripped acid extract | 3.3% |  | 0.4% |  | 1.0%. |

We claim:

1. The process of recovering a secondary alcohol from a sulfuric acid extract of 70 to 93% sulfuric acid concentration containing alkyl sulfates and free secondary alcohol which comprises diluting the sulfuric acid extract to 40 to 70% acid concentration, stripping the free secondary alcohol from the diluted extract while maintaining the alkyl sulfate content of the extract substantially constant by passing the dilute acid extract in countercurrent flow to steam in a stripping column and removing the stripped dilute sulfuric acid extract from the stripping column as soon as it reaches the bottom thereof, and further stripping the stripped sulfuric acid extract to recover additional secondary alcohol therefrom.

2. The process of recovering a secondary alcohol from a sulfuric acid extract of 70 to 93% sulfuric acid concentration containing alkyl sulfates and free secondary alcohol which comprises diluting the sulfuric acid extract to 40 to 70% acid concentration, stripping the free secondary alcohol from the diluted extract while maintaining the alkyl sulfate content of the extract substantially constant by passing the dilute acid extract in countercurrent flow to steam in a stripping column and removing the stripped dilute sulfuric acid extract from the stripping column as soon as it reaches the bottom thereof, hydrolyzing the withdrawn stripped extract, and further stripping the hydrolyzed extract to recover additional secondary alcohol therefrom.

3. The process of recovering secondary butyl alcohol from a sulfuric acid extract of 70 to 93% sulfuric acid concentration containing butyl sulfates and free secondary butyl alcohol which comprises diluting the sulfuric acid extract to 40 to 70% acid concentration, stripping the free secondary butyl alcohol from the diluted extract while maintaining the butyl sulfate content of the extract substantially constant by passing the dilute acid extract in countercurrent flow to steam in a stripping column and removing the stripped dilute sulfuric acid extract from the stripping column as soon as it reaches the bottom thereof, and further stripping the stripped sulfuric acid extract to recover additional secondary butyl alcohol therefrom.

4. The process of recovering secondary butyl alcohol from a sulfuric acid extract of 70 to 93% sulfuric acid concentration containing butyl sulfates and free secondary butyl alcohol which comprises diluting the sulfuric acid extract to 40 to 70% acid concentration, stripping the free secondary butyl alcohol from the diluted extract while maintaining the butyl sulfate content of the extract substantially constant by passing the dilute acid extract in countercurrent flow to steam in a stripping column and removing the stripped dilute sulfuric acid extract from the stripping column as soon as it reaches the bottom thereof, hydrolyzing the withdrawn stripped extract, and further stripping the hydrolyzed extract to recover additional secondary butyl alcohol therefrom.

5. The process of recovering a secondary alcohol from a sulfuric acid extract of 70 to 93% sulfuric acid concentration containing alkyl sulfates and free secondary alcohol which comprises diluting the sulfuric acid extract to 40 to 70% acid concentration, stripping the free secondary alcohol from the diluted extract in a plurality of stripping stages while maintaining the alkyl sulfate content of the extract substantially constant by passing the dilute acid extract in countercurrent flow to steam successively in a series of stripping columns and removing the stripped dilute sulfuric acid extract from each of the successive stripping columns as soon as it reaches the bottom of each column, hydrolyzing the diluted extract just prior to its entrance to the last of the series of stripping columns and stripping the hydrolyzed extract in the last stripping column to recover additional secondary alcohol therefrom.

VINCENT F. MISTRETTA.
HELMUTH G. SCHNEIDER.

REFERENCES CITED

The following references are of record in the file of this patent:

UNITED STATES PATENTS

| Number | Name | Date |
|---|---|---|
| 1,904,200 | Brooks | Apr. 18, 1933 |
| 2,061,810 | Shiffler et al. | Nov. 24, 1936 |
| 2,088,083 | Engs et al. | July 27, 1937 |
| 2,414,759 | Mottern | Jan. 21, 1947 |